United States Patent
Cheng et al.

(10) Patent No.: US 8,704,875 B2
(45) Date of Patent: Apr. 22, 2014

(54) APPARATUS FOR GENERATING REAL-TIME STEREOSCOPIC IMAGE AND METHOD THEREOF

(75) Inventors: Fang-Hsuan Cheng, Hsinchu (TW); Yu-Wei Chang, Hsinchu (TW)

(73) Assignee: Chung Hua University, Hsinchu County (TW)

( * ) Notice: Subject to any disclaimer, the term of this patent is extended or adjusted under 35 U.S.C. 154(b) by 298 days.

(21) Appl. No.: 13/186,242

(22) Filed: Jul. 19, 2011

(65) Prior Publication Data

US 2012/0242789 A1 Sep. 27, 2012

(30) Foreign Application Priority Data

Mar. 25, 2011 (TW) .............................. 100110241 A

(51) Int. Cl.
- *H04N 13/00* (2006.01)
- *H04N 13/02* (2006.01)
- *G06T 15/00* (2011.01)
- *G06K 9/40* (2006.01)

(52) U.S. Cl.
USPC ................ 348/43; 348/47; 345/419; 382/254

(58) Field of Classification Search
None
See application file for complete search history.

(56) References Cited

U.S. PATENT DOCUMENTS

| 6,466,207 B1* | 10/2002 | Gortler et al. | 345/427 |
|---|---|---|---|
| 8,395,642 B2* | 3/2013 | Yea et al. | 345/647 |
| 2006/0228036 A1* | 10/2006 | Avinash | 382/254 |
| 2007/0024614 A1* | 2/2007 | Tam et al. | 345/419 |
| 2008/0143876 A1* | 6/2008 | Kouramanis et al. | 348/553 |
| 2011/0115886 A1* | 5/2011 | Nguyen et al. | 348/47 |
| 2011/0141237 A1* | 6/2011 | Cheng et al. | 348/46 |

* cited by examiner

*Primary Examiner* — Joseph Ustaris
*Assistant Examiner* — Rebecca Volentine
(74) *Attorney, Agent, or Firm* — Chun-Ming Shih

(57) ABSTRACT

Disclosed is an apparatus and method for generating a real-time stereoscopic image from depth map. According to the depth information of the image, a depth-image-based rendering (DIBR) algorithm is used to shift (or move) the position of the object in the image to generate the stereoscopic image with parallax. When the object is shifted (or moved) away from its original position, a hole will occur in the original position. Therefore an image inpainting algorithm is developed to fill the hole. In order to achieve the real-time application, a hardware architecture and method have been developed to accomplish the DIBR and image inpainting algorithm.

13 Claims, 15 Drawing Sheets

| X | 1 | X |
|---|---|---|
| 1 | 0 | 1 |
| X | 1 | X |

Fig. 5 (a)

| 1 | X | 1 |
|---|---|---|
| X | 0 | X |
| 1 | X | 1 |

Fig. 5 (b)

| 0000 | 0001 | 0010 |
| --- | --- | --- |
| 0011 | 0100 | 0101 |
| 0110 | 0111 | 1000 |

APPARATUS FOR GENERATING REAL-TIME STEREOSCOPIC IMAGE AND METHOD THEREOF

BACKGROUND OF THE INVENTION

1. Field of the Invention

The present invention relates to a video processing technology, in particular, to a apparatus for transforming 2D images and videos into 3D images and videos and the method thereof

2. Description of Related Art

The commonly used 3D image generating technology, like DIBR (Depth Image Based Rendering), utilizes the image depth information and the geometric relations of a stereo camera (Toe-in or Off-axis are utilized in the camera setup), to change the position of the object in the image, thus generating a group of virtual stereoscopic images with parallax.

After generating the stereoscopic image, the moved position of the object creates the problem of vacant pixels (holes), which need to be filled. Most image inpainting methods progressively fill the holes, but the image orientation and similarity etc., make it hard to compute the image and are thus extremely time consuming; moreover to timely generate a 3D image, usually the hole is directly filled with the same pixel data as the neighboring pixel. The image filling algorithm needs to continuously update the priority of the image filling, therefore the computational requirements are extremely high, and the computational method is constantly changing, and is unsuitable for hardware design, and the computational method therefore has to overcome these drawbacks through more fixed criteria.

There are more and more 3D stereoscopic products, but still no way of popularizing the technology for the average user; because it's difficult to realize a 3D stereoscopic image and the required filming devices are also extremely expensive, most television companies are unable to provide 3D stereoscopic programming, therefore most current use of this technology is restricted to gaming devices and the movie industry. Current 3D stereoscopic image generating technologies rely on processing methods in software, and the current 3D stereoscopic images in the abovementioned gaming devices and movies therefore require computers, with no way to achieve the goal of real time operation and application. If the goal of real-time stereoscopic image generation is to be achieved, it's necessary to use the software in conjunction with a high priced and high speed computing device, like CUDA (Computer Unified Device Architecture) to complete this goal. The cost however is too high and therefore it's impractical and not beneficial.

Therefore, all kinds of methods are continuously being developed to increase the image processing speed, but processing still occupies a large part of the operation. The time required for image inpainting however, is relatively short, as the image inpainting process simply fills the hole with the neighboring pixel information. As the pixels are small, the effect of this image inpainting process is barely satisfactory, but if the pixels are bigger, the effects of the image inpainting process will not be ideal. At the same time, the processing priority actions of the image inpainting algorithm are not easily designed on the hardware circuit, as it needs to keep updating the filling priority values, as every pixel needing to be filled has to be continuously updated, which is extremely time consuming.

Because of the above mentioned defects of the prior art, the applicant invented the apparatus (apparatus for generating a real-time stereoscopic image and method thereof) wishing to overcome the disorderly computing process, being solely realized through hardware, by simplifying the steps of the hole filling algorithm, thereby achieving a real-time stereoscopic 3D image generated from a 2D image, at the same time developing a chip, possessing low cost and a way to display real time images, to improve on the above mentioned shortcomings in use and method.

SUMMARY OF THE INVENTION

The purpose of the present invention is to simplify the complex methods of image inpainting and to design a method which is suitable for a hardware operation and can be applied to the hole filling technique required for generating the 3D stereoscopic image. Therefore, the present invention is hardware architecture which directly operates and generates real-time 3D stereoscopic images by rapidly filling the holes in the images.

In order to achieve the above goal, the invention provides a real-time stereoscopic images generating apparatus, coupled to a stereoscopic image displaying device, timely generating a 3D stereoscopic image according to the original 2D image and the depth map image, the apparatus including: a data controller coupled to the stereoscopic image displaying device so as to control a signal timing and process of the apparatus, and outputting the stereoscopic image to the stereoscopic image displaying device; a 3D image generator coupled to the data controller so as to receive the original 2D image and the depth map image and transform these images into a pair of binocular image with parallax; a scattered hole processor coupled to the data controller, utilizing a first mask to fill a hole; a gradient generator coupled to the data controller, utilizing a second mask and a RGB pixel value to compute a gradient direction of the pair of binocular images with parallax and generate a gradient direction value; and a hole filling processor coupled to the data controller, repeatedly searching for reference points of original image along an edge direction, whereby neighboring color information which is most similar with that of the edge point of the hole is selected as the reference point for image inpainting, and the stereoscopic image being sent to the data controller when the reference point of the hole edge cannot be found.

According to the above concept, when the hole filling processor searches for a filling reference point, the processor will first make a color space conversion, that is, transform RGB color space into YCbCr color space, and compute a color difference by using YCbCr color space, and select the point which is closest to the color difference as the filling reference point, then fill a hole next to the hole edge points by using a point on the orientation of the filling reference point.

According to the above purpose, the present invention additionally proposes a real-time stereoscopic images generating method, applied to a stereoscopic image displaying device, including the following steps:

(a) transforming an original image into a binocular stereoscopic image;
(b) filling a plurality of small hole regions of the binocular stereoscopic image;
(c) searching edge points of hole;
(d) searching for reference points of the original image along the edge direction, whereby neighboring color information which is the most similar with that of the edge point of the hole is selected as the reference point for image inpainting;
(e) filling up the hole based on the reference point; and (f) repeating steps (c)~(e), until all the holes are filled with the image, then transmitting the 3D stereoscopic image to the stereoscopic image displaying device.

Therefore, the present invention is able to timely generate the stereoscopic image, which is generated through hardware, so as to let the user more easily enjoy the produced stereoscopic vision, which meets the market demand for 3D displaying devices.

The invention, as well as its many advantages, may be further understood by the following detailed description and drawings in which:

BRIEF DESCRIPTION OF THE DRAWINGS

FIG. 5 is a schematic diagram showing two sets (a), (b) of 3×3 mask in an embodiment of the invention, wherein '1' denotes image pixel and '0' denotes hole pixel and 'X' denotes 'irrelevant data'.

DETAILED DESCRIPTION OF THE INVENTION

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

Figure 1:
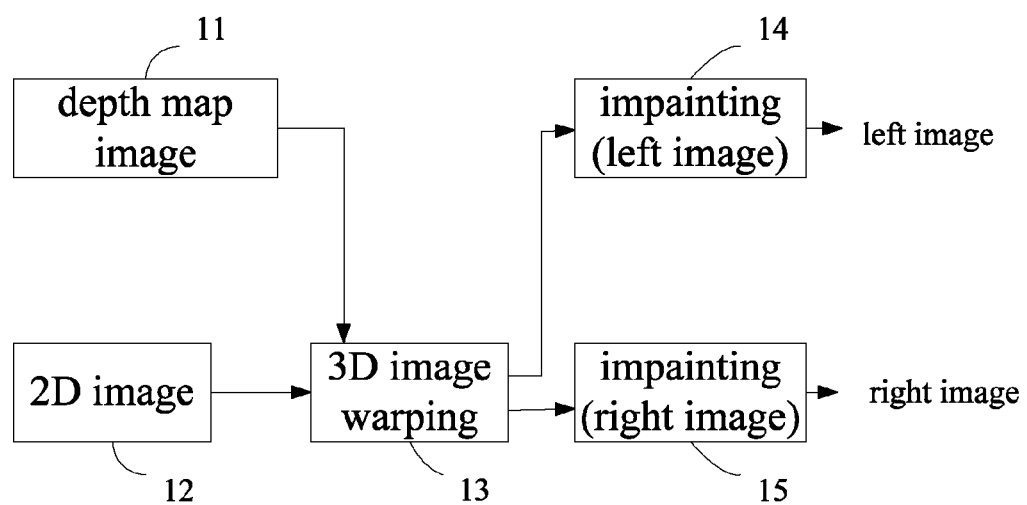
FIG. 1 is a schematic diagram showing the system configuration of the present invention.
Figure 2:
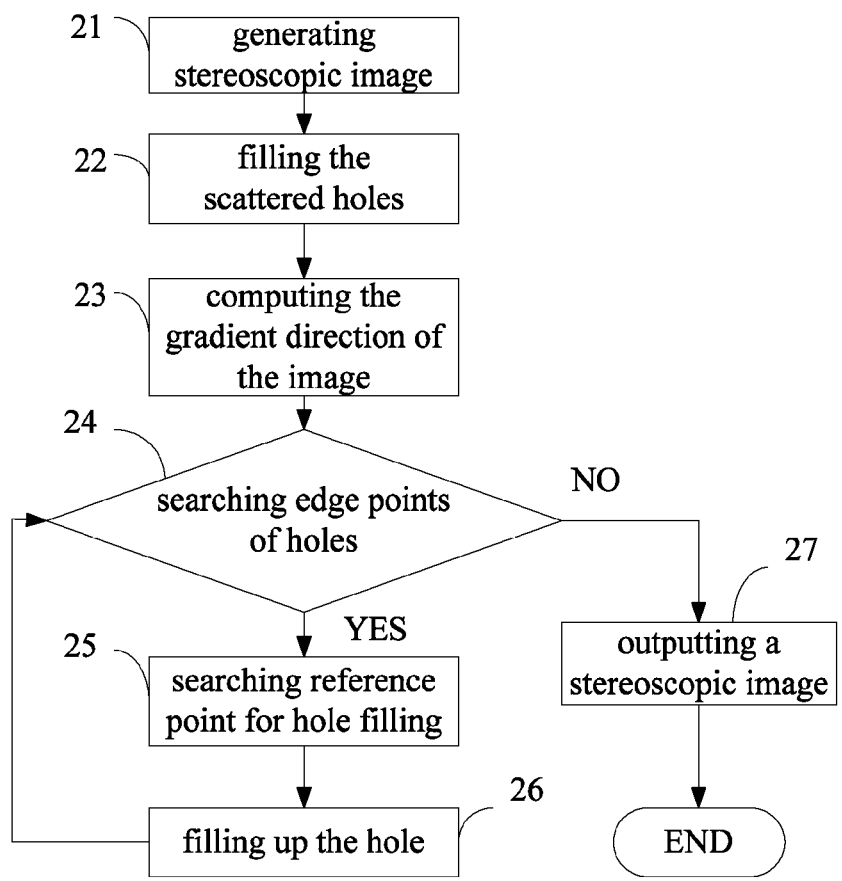
FIG. 2 is a system flow diagram showing a method for generating real-time stereoscopic images of the invention.

Please refer to FIG. 1, which is a schematic diagram showing the system configuration of the present invention. In order to directly transform the original 2D images 12 into 3D stereoscopic images, the depth camera must be used to obtain depth information, or the stereo camera is used to compute the relative depth information, or estimating the relative depth information of the image by analyzing the image feature, which utilizes color, clarity, geometric position and object size etc. In this embodiment, the depth map image 11 is obtained by utilizing the method of analyzing the image feature, then the 2D images 12 and the depth map image 11 in 3D images warping 13 and generating a pair of binocular stereoscopic images by utilizing the method of DIBR. In the process of generating the stereoscopic images, some holes appear because of moving the position of the image item, which must be filled by using the image inpainting algorithm. Therefore, left image inpainting 14 and right image inpainting 15 must be completed respectively, thereafter the left image and the right image will be output to a 3D image display to let the user be able to conveniently enjoy the stereoscopic vision. Please refer to FIG. 2, which is a system flow diagram showing a method of generating real-time 3D stereoscopic images of the invention. First of all, binocular stereoscopic image 21 is generated by using the method of DIBR, then filling the scattered holes 22 proceeds, which is the small hole region caused by the depth continuous variation. In this embodiment, a 3×3 mask is used to fill up the small holes produced by the continuous depth changes, and after filling the small hole region, computing the gradient direction of the image 23 for use in the image inpainting algorithm, and then searching edge points of holes 24 along the contour of holes proceeds.

After finding the edge point then searching for the reference point for hole filling 25 according to the orientation of the edge point color proceeds, whereby neighboring color information being the most similar with that of the edge point of hole is selected as reference point for image inpainting, and then filling up the hole 26 with the most similar image area along the edge of the reference point, afterwards, repeating steps 24~26 until no holes exist in the images, then outputting the 3D stereoscopic image 27 to the stereoscopic image displaying device.

Figure 3:
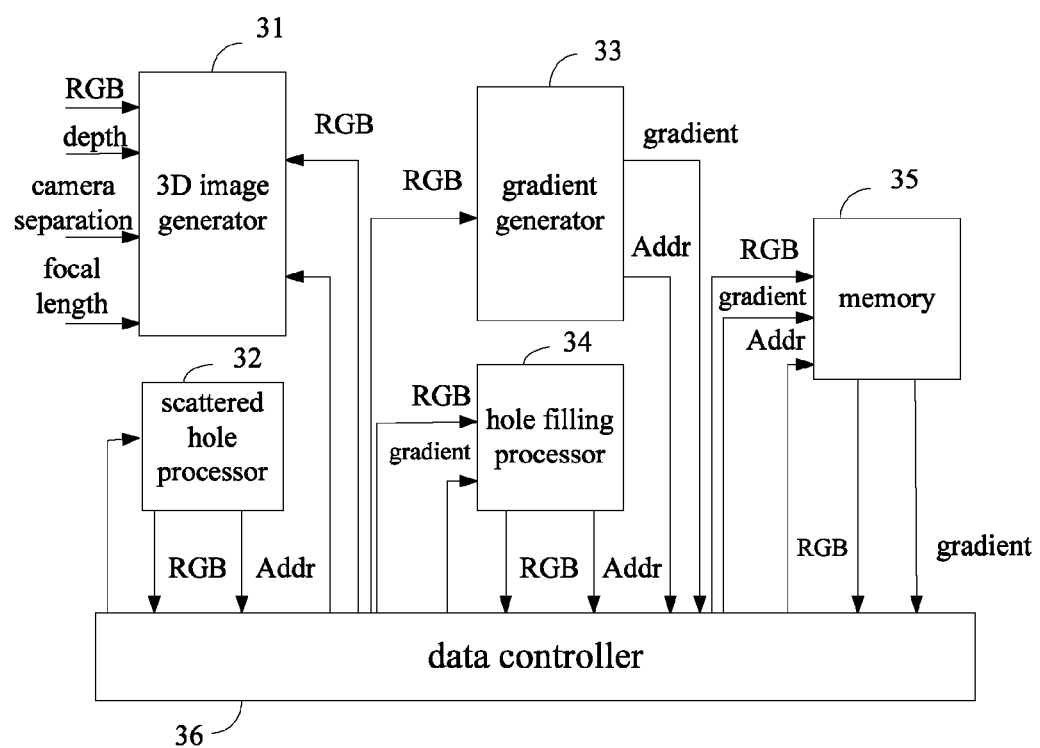
FIG. 3 is a block diagram showing an apparatus for generating real-time stereoscopic image of the invention.

Please refer to FIG. 3, which is a block diagram showing an apparatus for generating real-time stereoscopic images of the invention, including a 3D image generator 31, a scattered hole processor 32, a gradient generator 33, a hole filling processor 34, a memory 35, and a data controller 36. The memory 35 stores the pixel values and gradient values, and data controller 36 controls the data input and output from each blocks.

In the 3D image generator 31, the following equation can be obtained from the way the shift-sensor of the stereo camera is setup:

$$\text{Left: } u + \left(\frac{ft_c}{2Z_c} - \frac{ft_c}{2Z}\right)$$

$$\text{Right: } u - \left(\frac{ft_c}{2Z_c} - \frac{ft_c}{2Z}\right)$$

Where u is the x coordinate of original image, f is camera focus, tc is the distance between two cameras, Zc is the distance from focal point of object to camera and Z is the depth of object. The equation is used to render the stereoscopic image, and adding the gradient value to the address generated by the image, and storing the stereoscopic image into the corresponding memory address.

Figure 4:
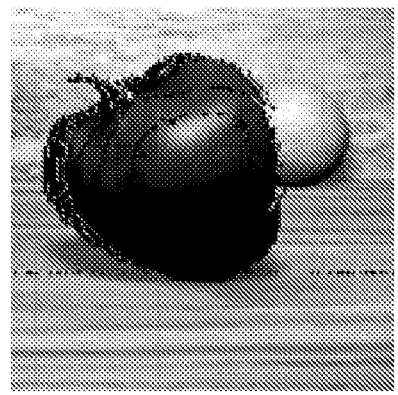
FIG. 4 is a schematic diagram showing scattered holes of the present invention.
Figures 5A, 5B:
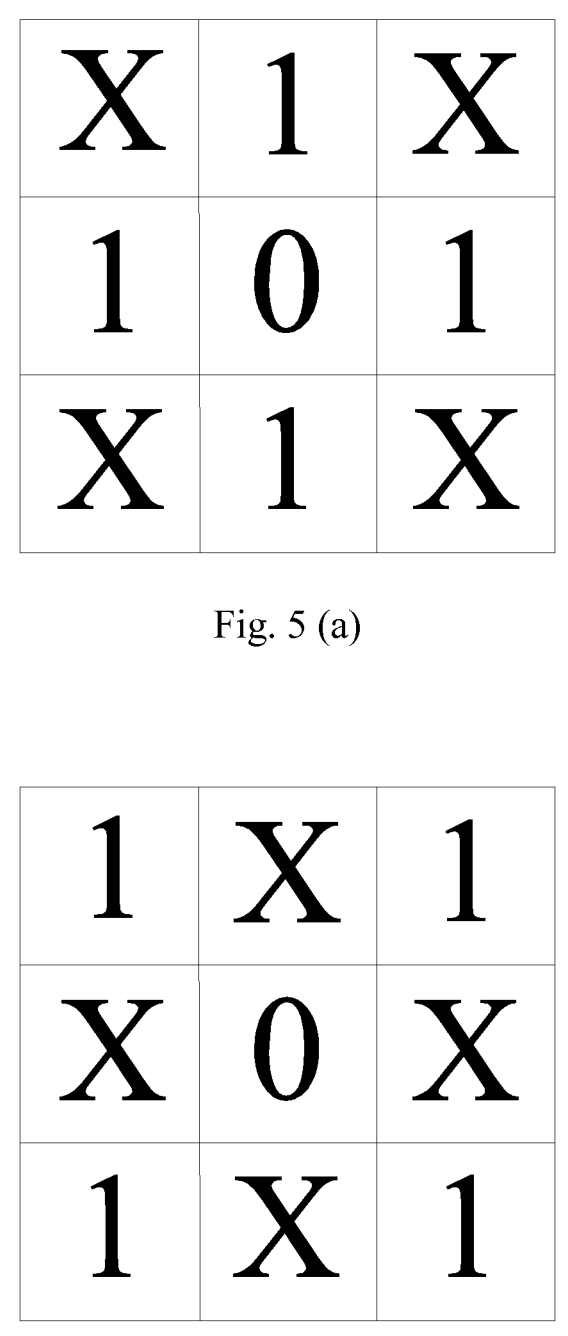

Please refer to FIG. 4, which is a schematic diagram showing scattered holes of the present invention. When generating the binocular stereoscopic image, scattered holes appear in the image due to the more moderate variation of the depth. In order to fill these scattered regions, two 3×3 masks are used to scan the left and right eye images, and the two 3×3 masks are shown as FIGS. 5 (a) and (b).

Figures 6, 7:
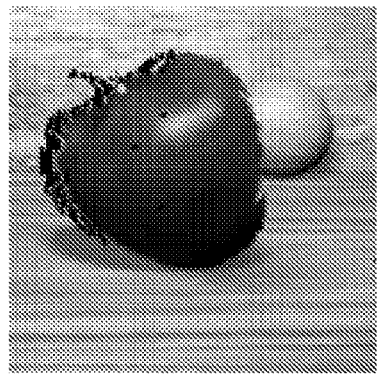
FIG. 6 is an image diagram showing completely filled scattered holes in one embodiment of the present invention.
FIG. 7 is a schematic diagram showing the respective location of the control signals in a 3×3 mask in one embodiment of the present invention.

When scanning by these two sets of masks, when any blocked area satisfies the conditions of the masks, the pixel value of the empty hole will be replaced by an average value of the neighboring color pixel from the matching mask. Then the scanning is repeated until no empty hole satisfies the conditions of the two sets of masks. Every empty space showing whether it is the flagged bit of an empty hole, if the empty space is flagged as=1, this represents a pixel value, and if the empty space is flagged as=0, this represents an empty hole. The completed processed image is as shown in FIG. 6.

In the scattered hole processor 32, the data is read from the memory address which corresponds to a 3×3 mask, and the scattered hole processor 32 determines if the data corresponds with one of the two sets of 3×3 masks, thereafter filling the average value of the pixels around the hole according to the mask and then storing back to the memory. The address corresponding to the 3×3 mask and the corresponding position of the control signals (0000~1000) from the mask are shown in FIG. 7.

In the gradient generator 33, the 5×5 Sobel mask separates and computes the R, G, B pixel values of image, and the gradient direction at each point of the image is computed for use in the image inpainting algorithm which follows. The formula for computing the gradient direction is shown as below, $$S_x = \begin{bmatrix} 1 & 2 & 0 & -2 & -1 \\ 4 & 8 & 0 & -8 & -4 \\ 6 & 12 & 0 & -12 & -6 \\ 4 & 8 & 0 & -8 & -4 \\ 1 & 2 & 0 & -2 & -1 \end{bmatrix},$$

$$S_y = \begin{bmatrix} -1 & -4 & -6 & -4 & -1 \\ -2 & -8 & -12 & -8 & -2 \\ 0 & 0 & 0 & 0 & 0 \\ 2 & 8 & 12 & 8 & 2 \\ 1 & 4 & 6 & 4 & 1 \end{bmatrix}$$

$$g_{xx} = |Gx_R|^2 + |Gx_G|^2 + |Gx_B|^2$$
$$g_{yy} = |Gy_R|^2 + |Gy_G|^2 + |Gy_B|^2$$
$$g_{xy} = Gx_R * Gy_R + Gx_G * Gy_G + Gx_B * Gy_B$$

$$\theta = \frac{1}{2}\tan^{-1}\left[\frac{2g_{xy}}{(g_{xx} - g_{yy})}\right]$$

Wherein, the angle computation of $\tan^{-1}$ is obtained from the method of checking the chart.

The hardware design concept of the gradient computation and the design concept of the scattered hole filling is similar, because both use the mask methods. The process is that the data of the memory is read from a memory address which corresponds to a 5×5 mask, and the gradient direction is then computed, and thereafter the computed gradient direction value is written and stored in the memory thereof.

The computation of the gradient direction is by temporarily storing the pixel values of the 5×5 block area, and is computed according to the gradient value and the gradient direction value computed by the control signal, the calculation including the directional values: 0°, 22°, 45°, 67°, 90°, 112°, 135°, 157° and 180°.

Figure 8:
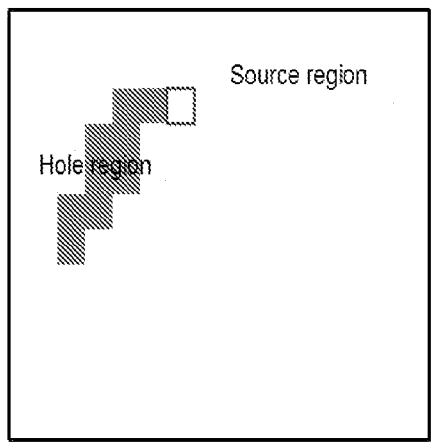
FIG. 8 is a schematic diagram showing the hole filling algorithm in one embodiment of the present invention, wherein (a) searches the edge points of hole (b) searches for reference points in the original image for filling the hole (c) fills up the hole based on the reference point.
Figure 8B:
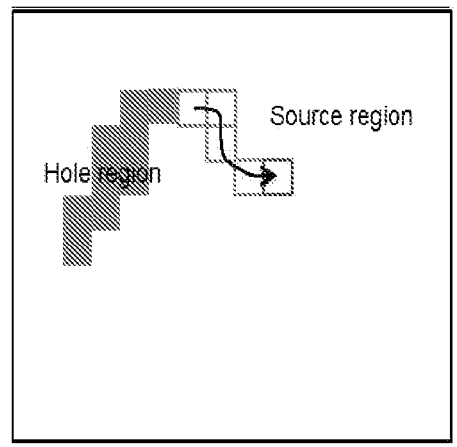
Figure 8:
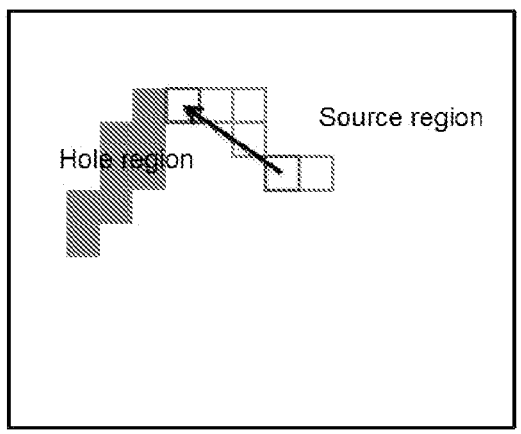

Please refer to FIG. 8, which is a schematic diagram showing a hole filling algorithm of one embodiment of the present invention, wherein (a) searches the edge points of hole (b) searches for a reference point in the original image for the hole to be filled (c) fills up the hole based on the reference point. In one embodiment, in order to reduce the complexity of hardware implementation, the inpainting algorithm is divided into three steps as depicted in FIG. 8, having the following three main steps:

Step 1: searching edge points of holes ;

Step 2: searching for the reference point of the original image along the edge direction, and where the neighboring color information is the most similar with that of the edge point of hole, is selected as the reference point for image inpainting;

Step 3: the hole of the edge point is filled up with the image of the reference point, and the above three steps are repeated until all the holes are filled with the image.

A color space conversion should be performed before searching for the reference point, that is, transforming a RGB color space into an YCbCr color space, and computing the color difference by using the YCbCr color space.

The address and the gradient direction cost of an anterior reference point will generate addresses according to the orientation, so as to compute the color difference between the pixel value of the memory 35 and the pixel value of the reference point. Finally, the address and the gradient direction cost of the point which is the minimum color difference will be output for the next level of hole filling. After determining that the pixel value is valid, the address for inputting hole and the read out pixel values will be written to memory 35.

The algorithm is calculated by scanning the image one time to generate a stereoscopic image, then multiple scans of the 3×3 mask, then one scan of the 5×5 mask of the computed gradient direction, and finally multiple scans of the filled holes. The computational complexity is as shown below:

$$\frac{p + 9np + 25p + mp}{f_q}$$

Wherein, p denotes the image size, n is the scanning time of 3×3 mask, m is the scanning time for hole filling and fq is the clock frequency. Usually m is equal to the width of the biggest hole in the image. In one embodiment, running at the clock speed of 150 MHz (320×240@30 fps), the goal of real-time computation can be realized.

Figure 9:
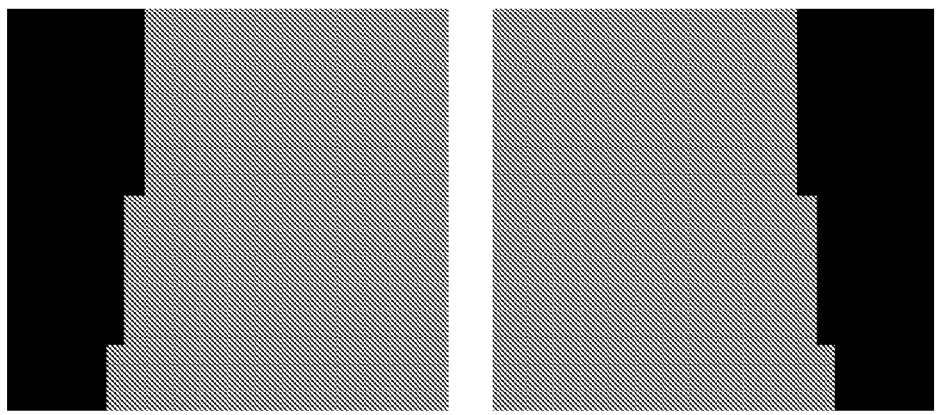
FIG. 9 is a schematic diagram showing the edge of the hole in one embodiment of the present invention.

Please refer to FIG. 9, which is a schematic diagram showing the edge of the hole of one embodiment of the present invention, wherein black represents the hole, and gray represents the pixel value. The incompletely filled stereoscopic diagram shows that the hole edge reference point can be found by the flag signal changes in the rising and the falling edge, and then the found pixel value and direction value of the edge point and the address are output to the memory 35.

Figure 10:
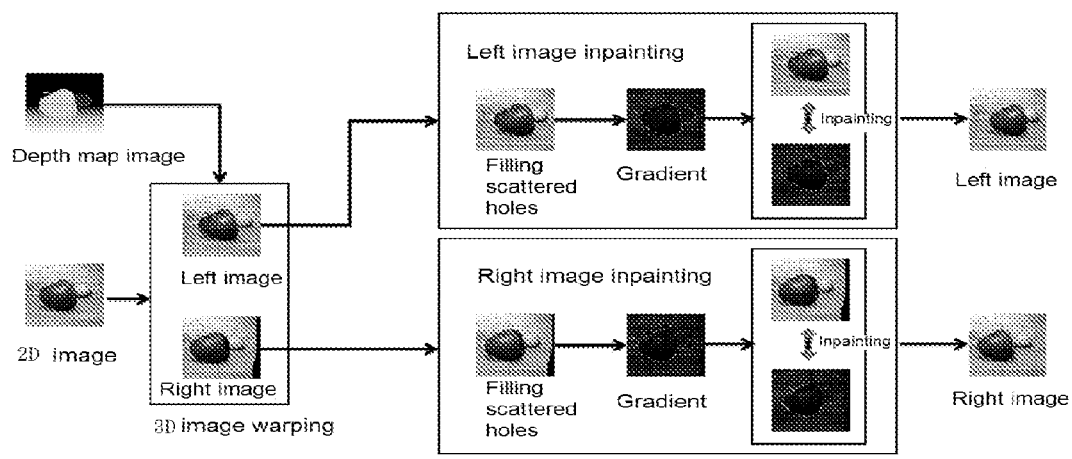
FIG. 10 is the flowing schematic diagram showing image generation of the invention.
Figure 11:
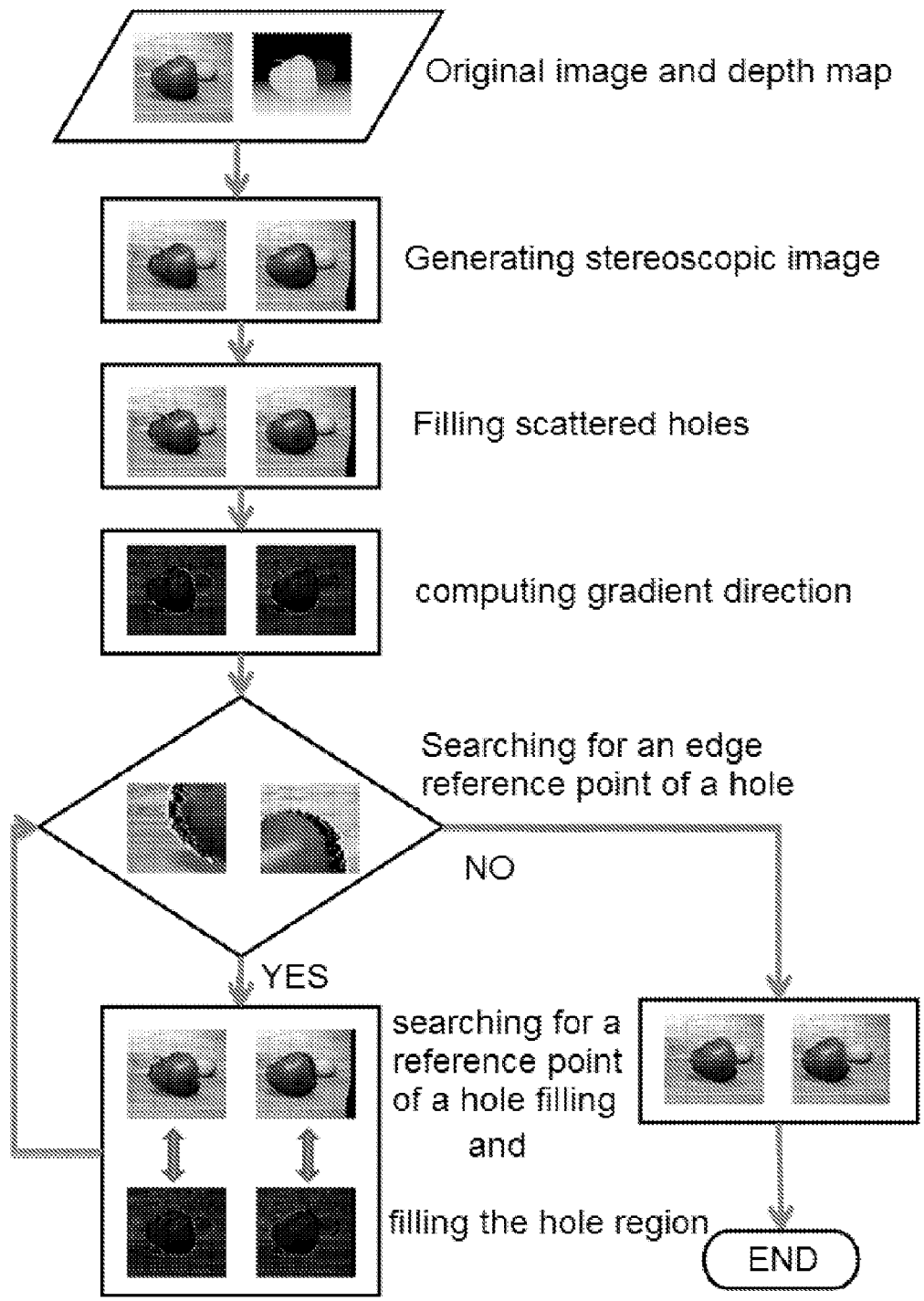
FIG. 11 is the flowing schematic diagram showing another image generation of the invention.

In order to clarify the invention further, please refer to FIG. 10 and FIG. 11. FIG. 10 is the flowing schematic diagram showing image generation of the invention and FIG. 11 is the flowing schematic diagram showing another image generation of the invention.

Then, analyzing the results of each embodiment of six different types of background images, the computing time of the six images are shown in table 1, and it can be seen that this method is sufficient to achieve real-time computation.

TABLE 1

| Test Image Type | Computation Time |
| --- | --- |
| artificial background image | 8513224 ns => 8.5 ms |
| sky background image | 9298261 ns => 9.3 ms |
| chess board background image | 8709884 ns => 8.7 ms |
| foreground occluded image | 7800324 ns => 7.8 ms |
| indoor object image | 8491192 ns => 8.5 ms |
| outdoor natural image | 9731466 ns => 9.7 ms |

Figure 12:
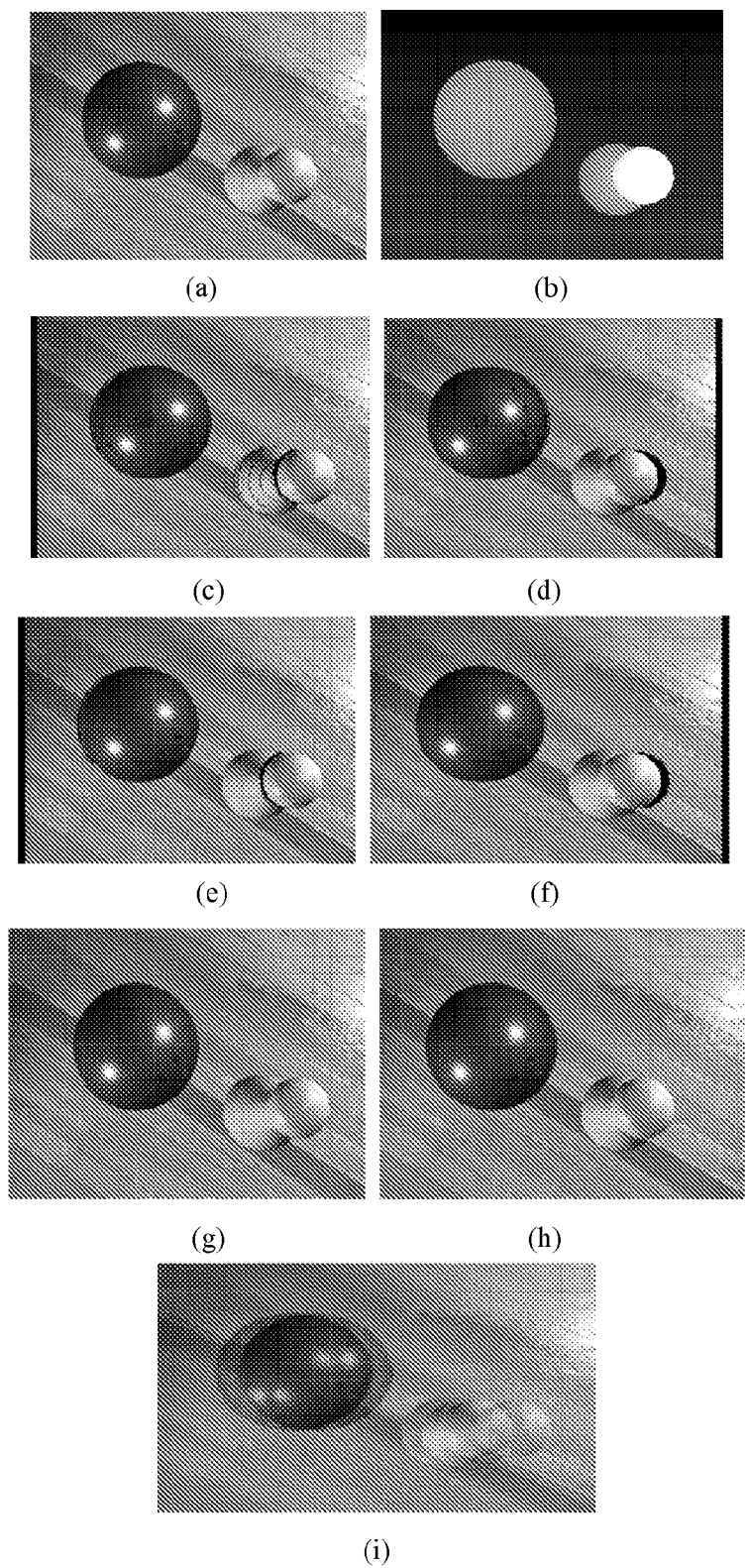
FIG. 12 is an experimental result of stereoscopic images of the artificial background in one embodiment of the invention, wherein (a) is an original image, (b) is a corresponding depth map, (c) is a generated left eye image, (d) is a generated right eye image, (e) is a left eye image smoothed by 3×3 mask, (f) is a right eye image smoothed by 3×3 mask, (g) is a left eye image after hole filling, (h) is a right eye image after hole filling and (i) is a stereoscopic image from left and right eye image vertically interlaced.

Please refer to FIG. 12, which is an experimental result of stereoscopic images of the artificial background of one embodiment of the invention, wherein (a) is an original image, (b) is a corresponding depth map, (c) is a generated left eye image, (d) is a generated right eye image, (e) is a left eye image smoothed by 3×3 mask, (f) is a right eye image smoothed by 3×3 mask, (g) is a left eye image after hole filling, (h) is a right eye image after hole filling and (i) is a stereoscopic image from left and right eye image which is vertically interlaced. The original image shows a bowling ball and bowling pin placed on a wooden bowling alley, each wood color and texture on the alley is different, even so, the filling results of each wood color and texture are generally correct.

Figure 13:
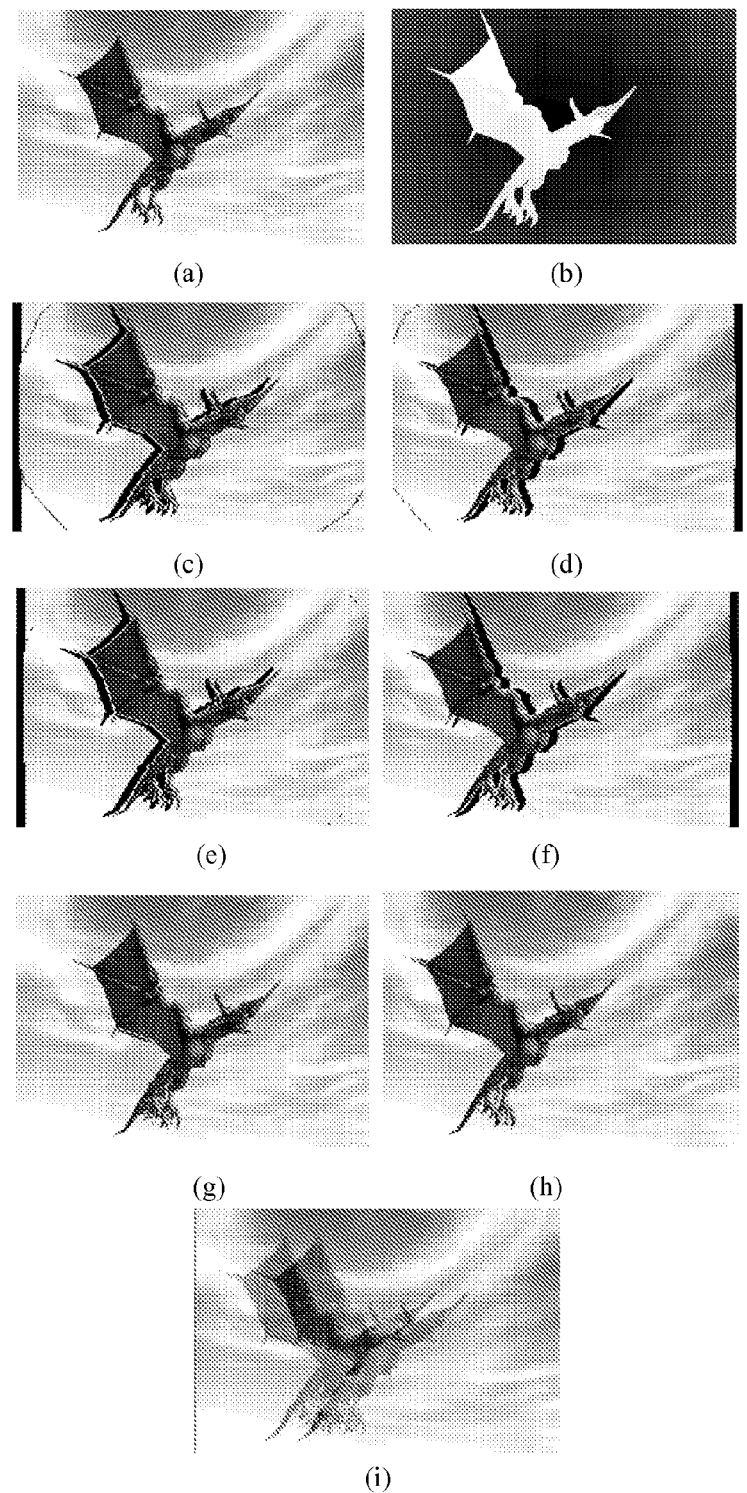
FIG. 13 is an experimental result of stereoscopic images of the natural background of one embodiment of the invention, wherein (a) is an original image, (b) is a corresponding depth map, (c) is a generated left eye image, (d) is a generated right eye image, (e) is a left eye image smoothed by 3×3 mask, (f) is a right eye image smoothed by 3×3 mask, (g) is a left eye image after hole filling, (h) is a right eye image after hole filling and (i) is a stereoscopic image from left and right eye image vertically interlaced.

Please refer to FIG. 13, which is an experimental result of stereoscopic images of the natural background of one embodiment of the invention, wherein (a) is an original image, (b) is a corresponding depth map, (c) is a generated left eye image, (d) is a generated right eye image, (e) is a left eye image smoothed by 3×3 mask, (f) is a right eye image smoothed by 3×3 mask, (g) is a left eye image after hole filling, (h) is a right eye image after hole filling and (i) is a stereoscopic image from left and right eye image vertically interlaced.

The original image is a creature flying in the sky, having a background which is an irregular natural image. The figure shows that the filling result of the background is better than that of the artificial background, which is due to the background being irregular, and therefore the effect on the filling priority sequence is decreased. In FIG. (g) and (h), some portions around the wings and between the two legs are filled imperfectly, since the problem of the filling fault is caused by the narrow foreground region around the wing area, and the background reference points are extremely few.

Figure 14:
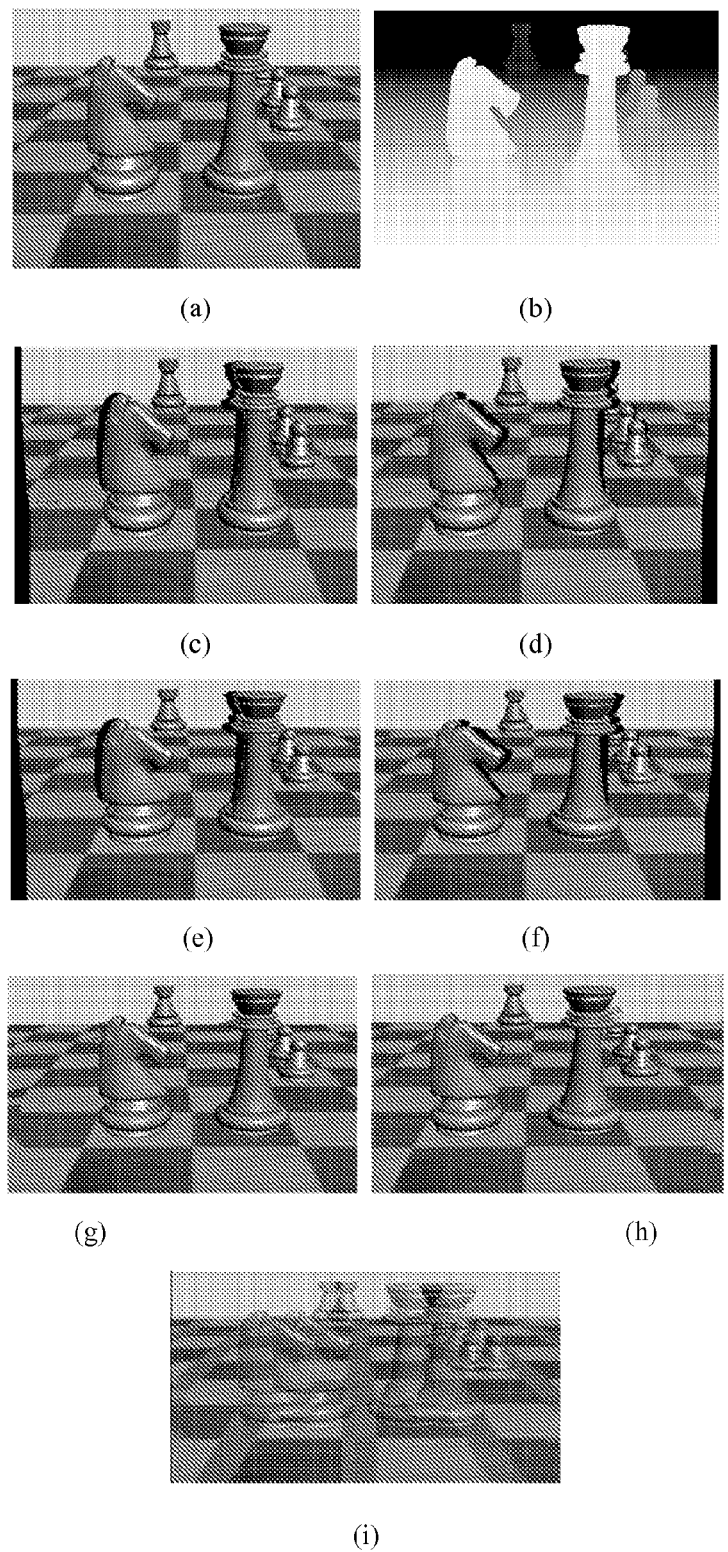
FIG. 14 is an experimental result of stereoscopic images showing the chess board background in one embodiment of the invention, wherein (a) is an original image, (b) is a corresponding depth map, (c) is a generated left eye image, (d) is a generated right eye image, (e) is a left eye image smoothed by 3×3 mask, (f) is a right eye image smoothed by 3×3 mask, (g) is a left eye image after hole filling, (h) is a right eye image after hole filling and (i) is a stereoscopic image from left and right eye image vertically interlaced.

Please refer to FIG. 14, which is an experimental result of stereoscopic images showing the chess board background of one embodiment of the invention, wherein (a) is an original image, (b) is a corresponding depth map, (c) is a generated left eye image, (d) is a generated right eye image, (e) is a left eye image smoothed by 3×3 mask, (f) is a right eye image smoothed by 3×3 mask, (g) is a left eye image after hole filling, (h) is a right eye image after hole filling and (i) is a stereoscopic image from left and right eye image vertically interlaced.

The original image is a chess board background, which is composed of dark and light square pieces, and the overall filled result shows that the image is slightly offset.

Figure 15:
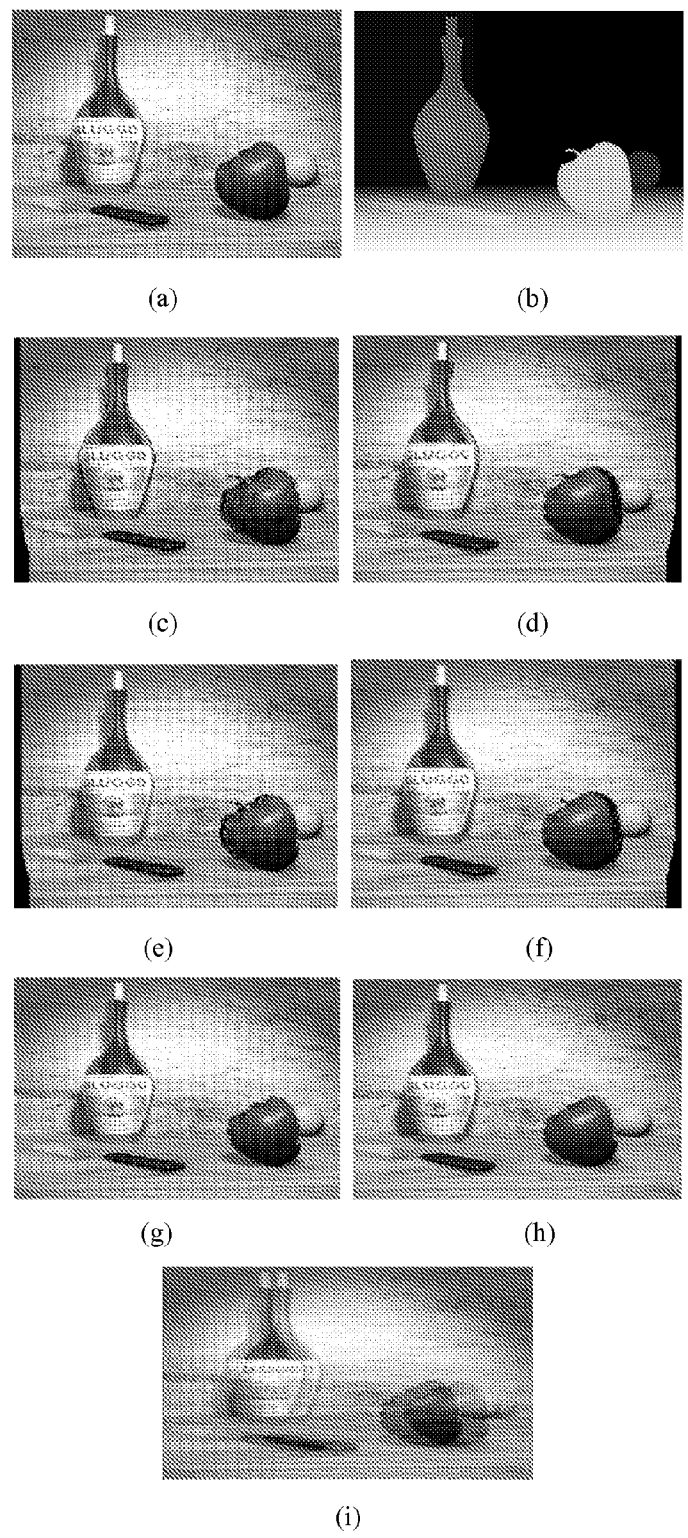
FIG. 15 is an experimental result of stereoscopic images showing the foreground occluded image in one embodiment of the invention, wherein (a) is an original image, (b) is a corresponding depth map, (c) is a generated left eye image, (d) is a generated right eye image, (e) is a left eye image smoothed by 3×3 mask, (f) is a right eye image smoothed by 3×3 mask, (g) is a left eye image after hole filling, (h) is a right eye image after hole filling and (i) is a stereoscopic image from left and right eye image vertically interlaced.

Please refer to FIG. 15, which is an experimental result of stereoscopic images showing the foreground occluded image of one embodiment of the invention, wherein (a) is an original image, (b) is a corresponding depth map, (c) is a generated left eye image, (d) is a generated right eye image, (e) is a left eye image smoothed by 3×3 mask, (f) is a right eye image smoothed by 3×3 mask, (g) is a left eye image after hole filling, (h) is a right eye image after hole filling and (i) is a stereoscopic image from left and right eye image vertically interlaced. The original image is of a foreground occluded image, that is, the image shows an apple and an orange overlapping. Next to the apple, the hole region contains the background and the orange. The result shows that the texture is still offset a little, and the filling result of the orange is not so round, however, the image colors are basically correct.

Figure 16:
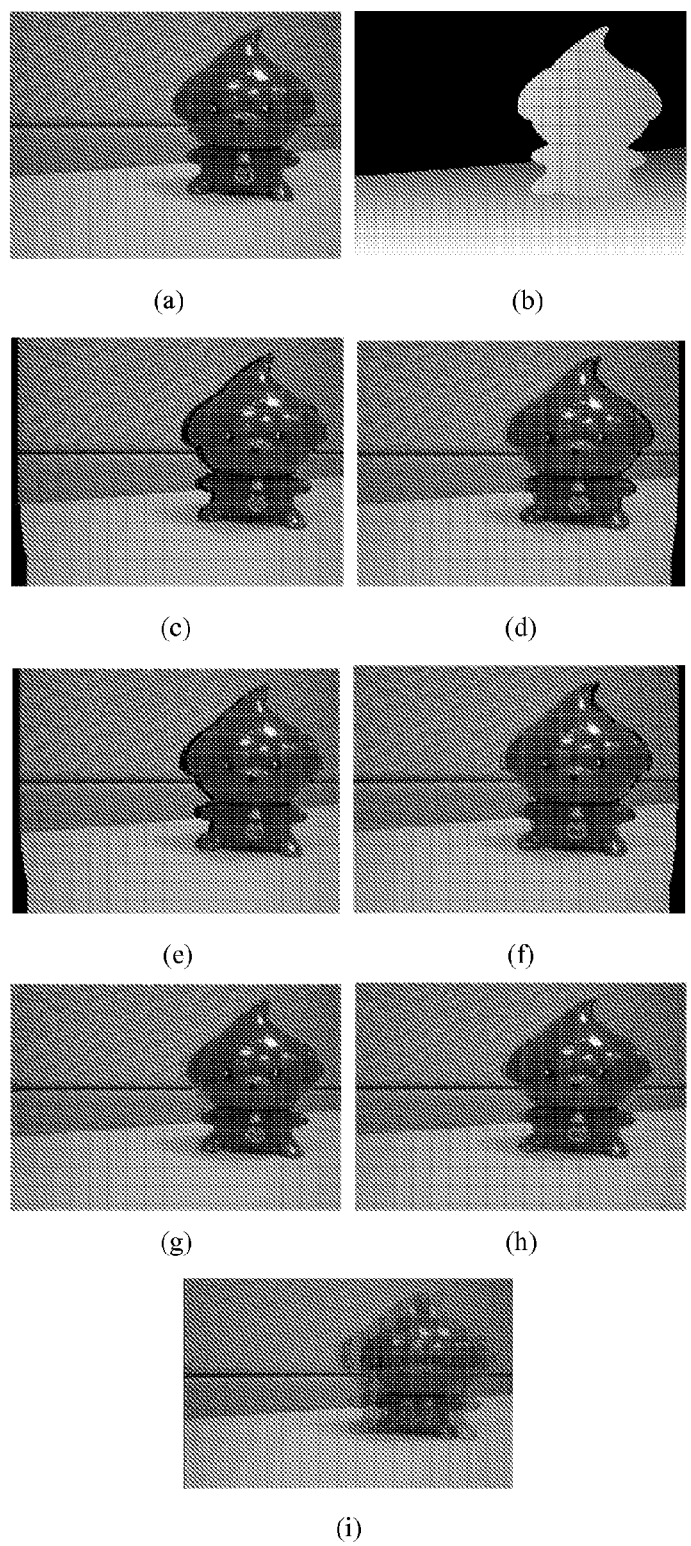
FIG. 16 is an experimental result of stereoscopic images showing an indoor object image in one embodiment of the invention, wherein (a) is an original image, (b) is a corresponding depth map, (c) is a generated left eye image, (d) is a generated right eye image, (e) is a left eye image smoothed by 3×3 mask, (f) is a right eye image smoothed by 3×3 mask, (g) is a left eye image after hole filling, (h) is a right eye image after hole filling and (i) is a stereoscopic image from left and right eye image vertically interlaced.

Please refer to FIG. 16, which is an experimental result of stereoscopic images showing an indoor object image, wherein (a) is an original image, (b) is a corresponding depth map, (c) is a generated left eye image, (d) is a generated right eye image, (e) is a left eye image smoothed by 3×3 mask, (f) is a right eye image smoothed by 3×3 mask, (g) is a left eye image after hole filling, (h) is a right eye image after hole filling and (i) is a stereoscopic image from left and right eye image vertically interlaced. The original image is of an indoor object, which shows a slight offset around the edge when the filling is finished, however, the overall effect is quite good.

Figure 17:
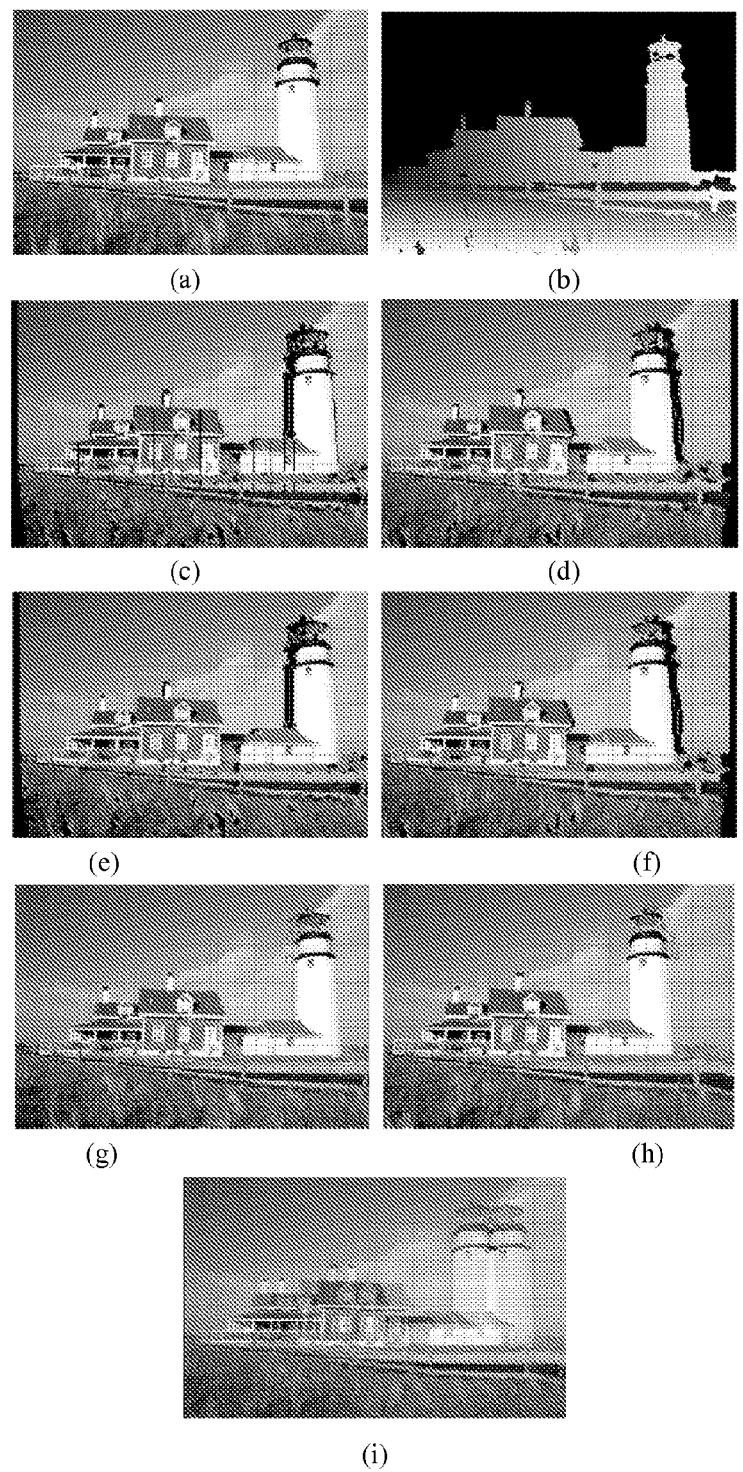
FIG. 17 is an experimental result of stereoscopic images showing an outdoor natural image in one embodiment of the invention, wherein (a) is an original image, (b) is a corresponding depth map, (c) is a generated left eye image, (d) is a generated right eye image, (e) is a left eye image smoothed by 3×3 mask, (f) is a right eye image smoothed by 3×3 mask, (g) is a left eye image after hole filling, (h) is a right eye image after hole filling and (i) is a stereoscopic image from left and right eye image vertically interlaced.

Please refer to FIG. 17, which is an experimental result of stereoscopic images showing the outdoor natural image in one embodiment of the invention, wherein (a) is an original image, (b) is a corresponding depth map, (c) is a generated left eye image, (d) is a generated right eye image, (e) is a left eye image smoothed by 3×3 mask, (f) is a right eye image smoothed by 3×3 mask, (g) is a left eye image after hole filling, (h) is a right eye image after hole filling and (i) is a stereoscopic image from left and right eye image vertically interlaced.

The original image is an outdoor nature image, which shows a slight offset around the edge of the image when the filling is finished, especially in the portion of the railing in FIG. (g) and (h), however, the overall effect is quite good.

To sum up, the present invention provides an apparatus and method for transforming 2D images and videos into 3D images, which not only simplifies the complex procedures of image implanting and shortens the time for the hole filling, but also timely transforms 2D images into 3D images directly, and can thus be applied in stereoscopic image displaying devices and meet the market demand of 3D displaying devices.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A real-time stereoscopic images generating apparatus, coupled to a stereoscopic image displaying device, timely generating a stereoscopic image according to an original 2D image and a depth map image, the apparatus comprising:
    a data controller coupled to the stereoscopic image displaying device so as to control a signal timing and process of the apparatus, and outputting the stereoscopic image to the stereoscopic image displaying device;
    a 3D image generator coupled to the data controller so as to receive and transform the original 2D image and the depth map image into a pair of binocular image with parallax;
    a scattered hole processor coupled to the data controller, utilizing a first mask to fill a hole;
    a gradient generator coupled to the data controller, utilizing a second mask and a RGB pixel value to compute a gradient direction of the pair of binocular image with parallax and generate a gradient direction value; and
    a hole filling processor coupled to the data controller, repeatedly searching for reference points of original image along an edge direction, whereby neighboring color information which is most similar with that of the edge point of the hole is selected as the reference point for image inpainting, the stereoscopic image being sent to the data controller when the reference point of the hole edge cannot be found,
    wherein when the hole filling processor searches for a filling reference point, the processor will first make a color space conversion, that is, transforming RGB color space into YCbCr color space, and computing a color difference by using YCbCr color space, and selecting the point which is closest to the color difference as the filling reference point, then filling a hole next to the hole edge points by using a point in a direction of the filling reference point.

2. The apparatus of claim 1, further comprising a memory coupled to the data controller so as to store an address, the RGB pixel value and the gradient direction value.

3. The apparatus of claim 1, wherein the 3D image generator uses Depth-Image-Based Rendering (DIBR) to generate the pair of binocular image with parallax.

4. The apparatus of claim 1, wherein the pair of binocular image with parallax generates scattered holes due to continuous depth changes.

5. The apparatus of claim 1, wherein the first mask is a 3×3 mask.

6. The apparatus of claim 1, wherein the second mask is a 5×5 mask.

7. The apparatus of claim 1, wherein the color difference is made by a computation of a first pixel value of an anterior filling reference point and a second pixel value of a posterior reference point, and each of the pixel values generated by addresses of each of the filling reference points and the gradient direction value, finally outputting the address of the smallest point of the color difference and the gradient direction cost to the next hole filling.

8. A real-time stereoscopic image generating method, applied to a stereoscopic image displaying device, comprising the following steps:
    (a) transforming an original image into a binocular stereoscopic image;
    (b) filling a plurality of small hole regions of the binocular stereoscopic image;
    (c) searching edge points of holes;
    (d) searching for reference points of original image along an edge direction, whereby neighboring color information which is most similar with that of the edge point of the hole is selected as the reference point for image inpainting;
    (e) filling up the hole based on the reference point; and
    (f) repeating steps (c)~(e) until all the holes are filled with image, then transmitting a 3D stereoscopic image to the stereoscopic image displaying device,
    wherein step (d) makes a color space conversion before searching for a filling reference point, that is, transforming a RGB color space into a YCbCr color space, and computing a color difference by using the YCbCr color space.

9. The method of claim 8, wherein step (a) uses Depth-Image-Based Rendering (DIBR) to generate a pair of binocular stereoscopic images, wherein the pair of binocular stereoscopic images is a virtual image with parallax, and generates a plurality of hole regions thereon due to continuous depth changes.

10. The method of claim 8, wherein step (b) uses a 3×3 mask scanning to fill the hole.

11. The method of claim 8, wherein step (c) uses a variation of the rising and falling edge of a flag signal to find the edge reference point.

12. The method of claim 8, wherein one step (d) uses a 5×5 mask and respective RGB pixel values of an image to compute a gradient direction on each point of the image and generate a gradient direction value for a following application of hole filling on the image.

13. The method of claim 8, wherein the color difference is determined by a computation of a first pixel value of an anterior filling reference point and a second pixel value of a posterior reference point, and each of the pixel values generated by addresses of each of the filling reference point and the gradient direction value.

* * * * *